United States Patent Office 2,839,158
Patented June 17, 1958

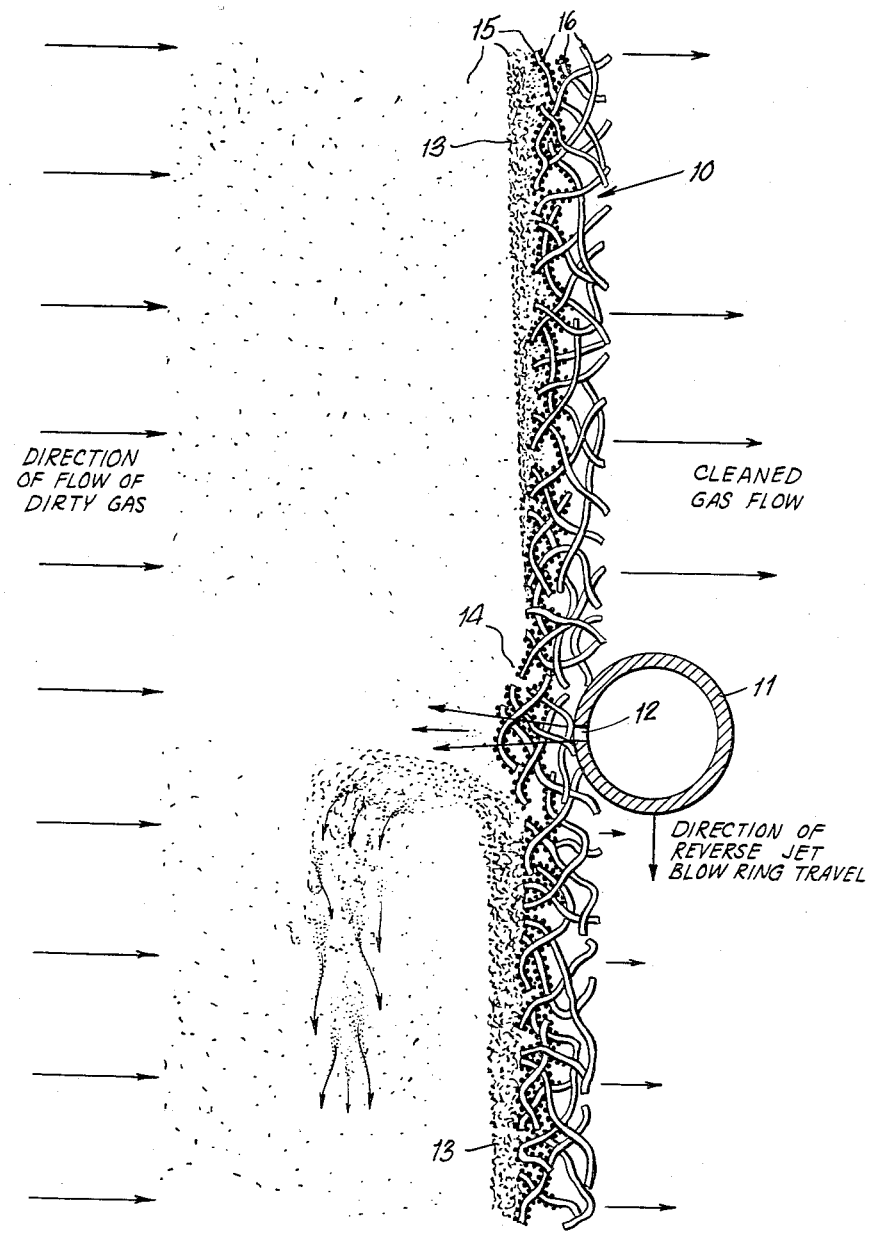

2,839,158

FILTER MEDIUM FOR DUST FILTERS

Thomas V. Reinauer, Westfield, N. J., assignor, by mesne assignments, to Metals Disintegrating Company, Inc., Elizabeth, N. J., a corporation of New Jersey Application December 20, 1955, Serial No. 554,259

13 Claims. (Cl. 183—51)

This invention relates to dust filters which are regularly cleaned of collected dust by dry methods and, more particularly, to dust filters containing non-volatile liquid silicone film coatings on fibrous filter material.

Filter cloth for removing particles suspended in gases is made up of fibers and passages through the fibers which permit the flow of the gas but filter out the suspended particles. In one type of filtering apparatus, the filter cloth is subjected periodically to a reverse flow of gas through the passages. The filter cloth in some of these apparatuses of reverse flow is subjected to a flexing. The action of the filter cloth in these apparatuses on the suspended particles removes a large percentage of the particles. The particles are not completely removed and a certain small but appreciable percent of the suspended particles penetrate through the filter cloth and deprive the filtering action of 100% efficiency. The suspended particles which penetrate through the filter are the subject of an action referred to as seepage. Seepage is generally gradual in nature and not principally the result of a rapid or immediate traverse of the particles through the filter. The particles which are the subject of seepage are small in size and of lesser dimension than the passage size. The material for dust filtering may be susceptible to chemical action and the absorption of moisture. It has been discovered that dust filtering material such as filter cloths, made up of felt or woven material, has improved filtering qualities as well as resistance to water if treated with non-volatile liquid siloxane. The fibers of the treated material are coated with non-volatile liquid films of siloxane. The treatment reduces the coefficient of friction between the filter fibers thus increasing the life of filter felt in reverse jet apparatus. The treated filter material provides a higher dust separation efficiency than similar untreated material. It is the theory of this invention that this greater efficiency is obtained by a substantial lessening of the seepage, which lessening is achieved by the non-volatile liquid siloxane film coating on the fibers.

It is an object of this invention to provide a means and method of reducing seepage through filter cloth which is regularly cleaned of collected dust.

It is another object of this invention to provide a filter for removing suspended particles from gas having a non-volatile liquid siloxane coating on fibers of the filter material.

It is a further object of this invention to provide a method for the production of an air filter medium by the coating of fibers of filter material with a non-volatile liquid silicone compound.

It is still another object of this invention to provide a dust filter from fibrous felt material which has improved dust filtering properties and retains the physical characteristics of an untreated dust filtering felt.

It is still a further object of this invention to provide a method of producing a dust filter means having a non-volatile, non-drying, non-hygroscopic liquid film on fibers of a material suitable for filtering dust particles from a gas.

It is also an object of this invention to provide a dust filter cloth comprised of a woven material having a coating of non-volatile liquid siloxane on the fibers of the cloth.

It is another object of this invention to provide a dust filter cloth having a siloxane coating film on the fibers to provide a surface action in the filtering of suspended particles from gases passed through the filter cloth.

These and other objects of this invention will become more apparent upon consideration of the following description, taken together with the accompanying drawing, in which:

The figure is a diagrammatic illustration of a section of a dust filter according to this invention and cooperating apparatus.

Filter cloth material whether composed of felt material or woven material, which is used in apparatus wherein the filter cloth is regularly cleaned of collected particles, will exhibit seepage. This cloth is pliable so as to be flexible under the action of the cleaning means. It is also desirable for this cloth to have sufficient elasticity in at least one dimension to meet the requirements of the cleaning means. The action of the cloth under the regular cleaning enhances the seepage of a part of the suspended particles. This invention reduces the seepage and counteracts the action of the cloth under the operation of the cleaning means to increase the efficiency of the separation.

It has been found that materials for removing suspended particles from gases have improved filtering characteristics when the fibers of the materials are coated with a non-volatile liquid siloxane film. A substantial proportion of fine particles are separated from the effluent gas. These particles penetrate through the untreated material by seepage and the percenage of these particles that are removed from the gas by the filter of this invention is substantially increased.

This invention has been found particularly applicable to filter cloth of felted material, filter cloth of woven mole skin, sateen and similar woven materials. Wool fibers, making up the major part of filter cloth felt, have a diameter range of from 40 to 100 microns.

These fibers are packed to form a fibrous material having interstices between the fibers which form tortuous passages having means diameters of the order of the diameter of the fibers. A dust-carrying gas is passed through the filter material from which a filtered gas escapes with a high proportion of the suspended solid particles removed. The removal of the suspended solid particles takes place upon the passage of the gas through the felt material. To obtain a substantial through-put of gas and to provide a filtered gas of substantial volume, it is necessary that the passages through the filter material be large enough to allow a large flow of gas. The dust particles, which are removed from the filtered gas, are of a smaller size than the cross-section of the passages through the filter. Some of these particles are fine dust ranging from less than 1 micron to 4 microns in diameter. The dust particles, including the fine dust, are removed from the gas by an action which retains the dust particles on the fibers and not by the inability of the particles to move through the passages through the filter.

The filter cloth of this invention is pliable so as to be flexible under a regular cleaning action which removes collected dust from the cloth. The siloxane film coating on the filter cloth fibers provides a surface action which retains a substantial proportion of the fine dust from penetrating more than a part of the distance through the filter cloth. Thus, the separation efficiency is increased and only a small portion of the fine dust seeps entirely through the filter cloth under the flexing action which accompanies the regular cleaning of the filter cloth.

It has been discovered that the ability of dust filters of this invention to retain dust particles on the filter fibers is improved by the application to the fibers of a non-volatile silicone liquid which has a greater viscosity than 20 centistokes at room temperature. The non-volatile silicone fiber coating liquid of this invention remains liquid on the felt fibers during the use of the felt as a filter material and does not cure or dry to a non-liquid state. Siloxane silicones have been found to provide compounds having these qualities. Siloxanes with viscosities up to 60,000 centistokes at room temperature have been found to provide non-volatile liquid characteristics to a coating of the fluid on the fibers. The felt which may make up a filter cloth of this invention is sufficiently pliable to flex under the operation of a regular cleaning action. This flexing curves the felt in an arc through a relatively short sector and consequently causes the fibers to work with relation to each other. A representative piece of felt filter cloth may have a thickness of approximately 0.074 inch and a voids volume of approximately 70 percent. The siloxane fluid, which provides the fiber coating of this invention is applied to the felt to produce a coating film on the fibers. The coating film on the felt fibers may vary from around 1 micron in thickness up to several microns. In the felt specified above, a fiber coating of greater than 6 microns in thickness is objectionable. An excessively thick siloxane coating on the fibers causes the filtered dust particles to adhere to the filter material in layers which are not amenable to a regular cleaning operation. Accordingly, it is desirable to avoid coatings of such thickness on the filter fibers. In the above specified felt filter material, a fiber coating of more than 6 microns causes the adhesive layering of the filtered dust particles.

A felt filter treated with a silicone compound, according to this invention, does not lose its physical characteristics or softness and retains its pliability while exhibiting improved dust removing qualities. The silicone may be applied to the dust filter fibers in a liquid vehicle in which it is solvent or miscible or by a spray of fine particles in a gas under pressure. When applied by any of these methods, the silicone compound assumes a coating on the various individual fibers of the felt material to provide the properties of the product of this invention.

The accompanying figure shows a section of a felt dust filter in enlarged and diagrammatic form. A felt 10 is representative of a filter material according to this invention. A blow ring 11, cooperating with the felt 10, is in abutment with the felt 10 and has an aperture 12 through which an air jet is ejected against the contiguous felt 10. The felt 10 is composed of spaced fibers 16. The figure does not illustrate the dimensions of the spacing. The fibers 16 carry a coating film of non-volatile liquid siloxane of the nature described herein.

The felt 10 has collected a layer 13 of dust on the surface opposite the blow ring 11. The layer of collected dust is separated into two sections by a clear area 14 which is immediately opposite the blow ring 11. Particles 15 are suspended in the unfiltered gas and in the layer 13. A few particles 15 are also shown retained on the siloxane coating of the fibers 16.

The unfiltered gas is drawn to the felt 10 from the left side, as shown in the figure, and the cleaned filtered gas is drawn away from the felt on the right side, as seen in the figure. Thus, the gas is drawn in through the felt and the particles 15 are collected on the left surface as indicated by the layer 13. The blow ring moves repetitively and regularly down the felt 10 and blows a reverse jet of air from the felt 10 in the opposite direction to the gas flow. The ring 11 as it moves along the surface of the felt 10 flexes the felt.

The particles 15 adhere tenaciously to the siloxane coating on the fibers 16 along the tortuous paths provided through the felt 10 by the fibers 16. The retained particles 15 adhere to the fibers 16 mainly in the area of initial impingement of the dust particles 15 on the felt 10. The particles retained on the siloxane coating serve to limit and reduce the seepage of particles of less than 4 microns in size through the felt 10, particularly in the areas of flexing "A" and "B" immediately above and below the section of the felt which is contiguous with the blow ring 11 in its travel along the surface of the felt 10.

This surface action produced by the siloxane coating on the fibers 16 reduces the seepage of the fine dust which is made up of particles of less than 4 microns in size. The filter of this invention thus substantially reduces the small amounts of fine dust which filter mediums are prone to allow to pass through.

Polyorganosiloxanes are particularly applicable in this invention in providing a coating on the fibers of the filter material. Dimethyl-, methyl-, diethyl-, ethyl- and copolymerized methyl-phenyl siloxanes are the most desirable siloxanes for the coating of this invention. Polymerized polyorganosiloxanes have the following generic structural formula:

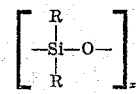

In this formula "R" represents a radical selected from the group of hydrogen and organic radicals. Polymerized dimethyl siloxanes which are fluid in the proper viscosity ranges have been acceptable in providing the fiber coating of this invention. Polymerized dimethyl siloxanes have the following generic structural formula:

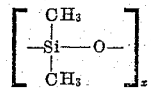

The average length of the chain determines the volatility and viscosity of the coating fluid. The more suitable coatings are provided by polymerized siloxane fluids which have a viscosity of above 50 centistokes at room temperature. These polymerized siloxanes have a negligible volatility at temperatures around 250° C. The polymerized siloxane fluids which have a viscosity of 20 centistokes or over at room temperature provide acceptable coatings on the filter fibers. These siloxanes are more volatile at higher temperatures than the more viscous siloxanes. The more volatile polymerized siloxanes have a negligible volatility at room temperature and are satisfactory for gaseous filtering. The siloxanes having a viscosity of around 350 centistokes at room temperatures provide the most satisfactory coatings.

The polydimethyl siloxane, having a viscosity of 350 centistokes at room temperature, possesses a viscosity in excess of 50 centistokes at 300° F. Other polydimethyl siloxanes, which have been found to provide acceptable coatings in the felt filter of this invention, are dimethyl siloxane polymers having viscosity ranging from 1,000 centistokes at room temperature to about 175 centistokes at 300° F., and also having a viscosity ranging from 12,500 centistokes at room temperature over 2,000 centistokes at 300° F.

Polyorganosiloxanes made up of a polymer of methyl siloxanes and phenyl siloxanes also provide acceptable coatings of non-volatile liquid on the fibers. These copolymers of siloxanes provide non-volatile liquids which have viscosity ranges of above 50 centistokes at the temperatures of normal use of the filters. These copolymers provide a liquid film which is substantially non-volatile at viscosities of below 50 centistokes. The liquid copolymers of methyl siloxane and phenyl siloxane are comparable to the non-volatile liquid dimethyl siloxane polymers.

Polyethyl siloxanes may also be employed as fiber coatings in the fluid state at viscosities in the ranges set forth above. The ratio of ethyl groups to silicon atoms in the diethyl siloxane polymer must be such as to provide a non-volatile permanent liquid for the fiber coating. A fiber coating fluid diethyl siloxane polymer is provided by an ethyl group to silicon atom ratio of over 1.5:1. It is preferable that the ratio be 2:1 or more.

Polydiethyl siloxanes with this ethyl group to silicon atom ratio provide satisfactory coatings which remain fluid during use and are non-volatile at temperatures of operation of the filter under the conditions set forth above. These polydiethyl siloxanes are, therefore, comparable to the dimethyl siloxanes.

Monomethyl and monoethyl siloxanes provide fiber coatings which are satisfactory for the filtering of dust from a gaseous medium. The viscosities of these compounds are selected to be comparable to the viscosities set forth above in providing a non-volatile, substantially permanent liquid coating.

The polymer of phenyl siloxane, having a viscosity of 500 centistokes may also be employed to provide the liquid coating on the fibrous material. This polymer is not as desirable as the polymers of methyl siloxane and ethyl siloxane. The important features are the permanent fluidity of the coating on the fibrous material; the non-volatility of the fluid siloxane coating and the non-hygroscopic properties of the fiber coating.

The coating may be applied to the filter cloth from a solution, emulsion, or by a spray mist method. The coating is applied to the felt material by the solvent method with the siloxane diluent in a suitable solvent, such as a ketone. The felt filter material is dipped in this solution to saturation. The excess solution is drained off and finally the diluent solvent ketone is permitted to evaporate leaving the fluid siloxane on the filter material. The fluid siloxane is in the form of a fluid coating on the fibers of the material. As it is non-volatile, it remains in the material after the evaporation of the solvent.

The following examples of the application of siloxane to a felt filter material are by way of illustration and not limitative on the scope of the invention.

*Example I*

One part by weight of polydimethyl siloxane is diluted in 25 parts by weight of methyl, ethyl ketone. A felt filter medium is dipped in the solution. The filter medium is removed from the solution and the excess solution is allowed to drain off. The diluent ketone solvent is evaporated from the felt to provide a coating on the felt fibers of dimethyl siloxane.

The felt filter material which has received the coating of dimethyl siloxane exhibits high dust removing efficiency in filtering gas passed through the filter.

*Example II*

One part by weight of 1,000 centistokes viscosity diethyl siloxane is dissolved in 20 parts by weight of methyl, ethyl ketone. Felt filter material is immersed in the siloxane solution and soaked to saturation. The excess solution is drained off and the solvent ketone evaporated to leave a coating of fluid polydiethyl siloxane on the fibers of the felt material.

The felt filter material has an increased efficiency in removing particles from gases passed through the felt material for filtering.

*Example III*

A solution of 25 parts by weight of methyl, ethyl ketone and 1 part by weight of a copolymer of dimethyl siloxane and phenyl siloxane, containing a high percentage of phenyl siloxane, is saturated in a filter material and the excess solution is drained off. The solvent methyl ethyl ketone is evaporated to dry the filter material and produce a coating on the fibers of the filter material of a non-volatile liquid film of the copolymer of dimethyl and phenyl siloxanes.

The filter cloth of this invention removes suspended particles from a gas as demonstrated on test equipment composed of a filter bag consisting of a treated filter cloth mounted in a blow ring dust collector machine. The blow ring dust collector machine is devised to provide regular removal of collected dust from the filter bag. In the testing procedure, a feed of gas-containing suspended particles is provided having a particle density of 10 grains Johns Manville "Celite 281" dust per cubic foot of gas. This dust is composed of 97% of particles of a size less than 325-mesh. The pressure differential through the filter bag is maintained at 3½ inches of water and the gas velocity is 18 feet per minute. A comparison of the separation results from filtering with filter bags composed of the filter materials set forth in Examples I, II and III with bags of the same material untreated, shows a substantial increase in dust collection efficiency by the use of the treated filter materials of the examples. The filter material of Examples I, II and III provides a reduction of seepage of fine dust.

*Example IV*

One part by weight of dimethyl siloxane is diluted in 25 parts by weight of ethyl-methyl ketone. A piece of 15 oz. per square yard moleskin material is immersed in the 4% concentration of siloxane. The saturated moleskin is removed from the solution and the excess solution is drained off. The diluent ketone solvent is evaporated to provide a coating of dimethyl siloxane on the fibers.

A filter bag is made up of the treated 15 oz. per square yard moleskin material and a similar section of untreated moleskin material. The test filter bag is mounted in the test blow ring dust collector machine and filters the test dust laden gas continuously for a period of 136 hours. Visual inspection indicates that the fiber coated section of the moleskin provides better dust retention than the untreated portion.

A gain in collection efficiency is realized by coating the fibers of the woven material with siloxane.

*Example V*

A 4% solution of dimethyl siloxane in methylethyl ketone is impregnated in an 11 oz. per square yard woven and napped moleskin material. The moleskin material is removed from the solution and the solvent evaporated to provide a siloxane coating on the fibers of the material.

A section of siloxane-treated 11 oz. moleskin and an untreated section of the same material is made up into a filter bag and tested on the blow ring dust collector test machine with the test dust laden gas. Visual inspection indicates the treated section of the filter bag has better dust retention than the untreated section.

The polysiloxane liquid film may be applied to the felt fibers either from a solution as set forth in the above examples, or from a water emulsion, or sprayed on the filter material by a spray mist from a nozzle.

*Example VI*

A water emulsion is prepared from 35 parts by weight of 350 centistokes viscosity dimethyl siloxane in 65 parts by weight of water. The 35–65% siloxane water emulsion is diluted to a concentration of 2% to 4% by weight of siloxane in water.

Wool felt filter material is passed through the siloxane water emulsion and saturated with the emulsion. The saturated felt filter material is removed from the emulsion after saturation and excess water is removed from the felt material by passing it through a process roll to provide a 100% increase in weight of the treated felt. The treated felt filter material is dried by evaporation of the water to produce a fluid film of non-volatile liquid dimethyl siloxane coating on the felt fibers.

The filter material separates dust from a gas passed through the filter material by collection of dust particles on the liquid coated fibers of the treated filter material. The siloxane water emulsion may contain an emulsifying agent to provide uniformity in the emulsion.

Felt filters, according to this invention, may also be prepared by treatment with a spray mist of siloxane polymer. A finished and dried felt filter material is sprayed by a mist of siloxane polymer of the proper viscosity. The mist is formed from a spray nozzle having a jet mist discharge orifice, which produces a mist having mist particles in a size range of from 1 to 15 microns.

One method of applying a non-volatile liquid siloxane coating to filter material is shown in the following example.

Example VII

An oil mist unit having a jet mist discharge orifice and reservoir for coating fluid is filled with 350 centistokes viscosity dimethyl siloxane. A piece of 0.078 inch thick felt weighing 52¾ ozs. is sprayed with 2.08 grams of dimethyl siloxane through the jet mist discharge orifice. The mist particle size ranges from 1 to 15 microns in a jet of a velocity of 38.3 ft. per second. The filter is supported on a screen during treatment and the nozzle is drawn over the filter material on the screen at a uniform rate. The filter is increased in weight by 4% and is provided with a non-volatile liquid coating on the felt fibers.

The filter material formed into a filter tube for the blow ring dust collection test machine produces a dust collection performance identical with filters described in the above examples.

The product of this invention as illustrated by the above examples exhibits an improvement in separating efficiencies in the filtering of dust from air. These separating efficiencies are higher than efficiencies obtainable with untreated wool felt material and reflect the reduction of seepage of fine dust. For example, the felt material impregnated with a siloxane of this invention exhibits an efficiency of 99.997% in the removal of fine dust particles from air. By comparison, felt filters without the fluid coating of siloxane exhibit an efficiency of 99.92%. The efficiency difference, provided by the siloxane coating is a substantial difference.

The filter cloth of this invention composed either of felt or woven material of the nature of moleskin and sateen is suitable for filter apparatus in which the cloth is continuously flexed by a regular dust removal operation. As indicated above in one of these dust removal operations, the filter cloth is periodically flexed over a substantial arc in a limited sector of the cloth. During this flexing a reverse-jet of gas through the cloth removes the accumulated collected dust, so that the filter cloth is regularly cleaned. The cloth of this invention is pliable, flexible and resilient to comply with the requirements of operation of the regular cleaning. As indicated in the examples, the filter cloth is a coherent material having a tensile strength which resists tearing on a blow ring collection apparatus. The siloxane coating on the cloth fibers provides a surface action on the fibers which reduces a seepage of fine dust of particles of 4 microns or less through the cloth against the action of the reverse jet.

The suspended particles collected from the gas do not penetrate the filter cloth substantially beyond the area of initial impingement except in the minute amounts indicated. The flexing of the filter cloth during the removal of the collected dust does not cause substantial seepage of fine dust because of the reduction of seepage by the action of the non-volatile, liquid siloxane film on the fibers of the cloth.

This application is a continuation in part of my co-pending application, Serial No. 233,939, filed June 27, 1951, entitled Filter Medium for Dust Filters, now abandoned.

In the above description, various embodiments have been set forth by way of illustration. It will be understood that modifications may be made in the described embodiment of this invention without departure from the spirit thereof. The percentage of siloxane in the water emulsion may be substantially varied. In the spray mist method of application, the siloxane may be applied continuously by moving the spray nozzles with relation to the material. It will, therefore, be understood that this description is provided by way of illustration and that the invention is limited only by the scope of the appended claims.

What is claimed is:

1. A filter medium for separating suspended particles from a gas, comprising in combination a flexible elastic, fibrous filter material, said material having a tensile strength to resist tearing, and a coating of non-volatile, liquid siloxane on fibers of said material to limit seepage of dust particles of less than 4 microns in size through said filter medium.

2. A dust filter for filtering dust from dust laden gas, comprising a flexible, elastic felt, said felt having a tensile strength to resist tearing, and a coating of a substantially non-volatile liquid polymerized siloxane on fibers of said felt to limit seepage of fine dust through said filter.

3. A dust filter for filtering dust from dust laden gas passing through said filter, comprising a flexible, elastic woven filter medium, said medium having tensile strength to resist tearing, said felted fibers being coated with a substantially non-volatile liquid polymerized siloxane.

4. The process of forming a dust filter comprising, applying a substantially non-volatile liquid polymerized siloxane carried in a diluent to a fibrous dust filter medium and thereafter removing the diluent, the siloxane being retained in the filter without substantially reducing the permeability of the filter.

5. The process of claim 4 in which the diluent is a ketone and the proportion of siloxane to ketone is about 1 to 25 parts.

6. The process of forming a dust filter comprising, applying a substantially non-volatile liquid polymerized siloxane carried in a diluent to a felt dust filter medium and thereafter removing the diluent, the siloxane being retained in the filter without substantially reducing the permeability of the filter.

7. The process of forming a dust filter comprising, applying to a wool felt filter medium a substantially non-volatile polymerized siloxane diluted about 1 to 25 parts of methyl ethyl ketone, the application being effected by dipping the filter medium in the siloxane-ketone mixture and thereafter removing the ketone, the siloxane being retained in the filter medium.

8. The process of forming a dust filter comprising, atomizing a substantially non-volatile liquid polymerized siloxane in a fine spray, applying said atomized siloxane to a fibrous filter medium in said spray and coating fibers of said filter medium with said non-volatile liquid polymerized siloxane, the siloxane being retained in the filter without substantially reducing the permeability of the filter.

9. In that type of fibrous filter for separating fine particles from gases wherein the filter is flexed and re-flexed, the combination of a fibrous filter material, fibers of said material defining spacing passages substantially greater than 4 microns in cross-section and variable in cross-section by said flexing and reflexing, non-volatile liquid siloxane film of not more than 6 microns in thickness on said fibers of a particle-retaining character, to thereby provide a surface action in which the liquid film operates, to retain particles of fine dust and limit the seepage through the filter of other particles of less than 4 microns in cross-section.

10. In a flexible filter for removing fine dust particles of less than 4 microns in cross-section from gas, a fibrous filter material, filter fibers in said material spaced more than 4 microns apart, a liquid film of not more than 6 microns in thickness consisting of non-volatile siloxane of a particle-retaining character on said fibers to thereby provide a surface action in which the liquid film operates to retain some of the particles of fine dust and limit the seepage of other particles of fine dust.

11. The process of claim 4 in which the fibrous dust filter medium is a woven dust filter medium.

12. The process of claim 4 in which the diluent is water and the non-volatile liquid siloxane is carried in an emulsion in said water.

13. The process of claim 6 in which the diluent is a ketone and the proportion of siloxane to ketone is about to 1 to 25 parts.

References Cited in the file of this patent

UNITED STATES PATENTS

| | | |
|---|---|---|
| 2,347,031 | Cupery | Apr. 18, 1944 |
| 2,392,805 | Biefeld | Jan. 15, 1946 |
| 2,495,635 | Hersey | Jan. 24, 1950 |
| 2,556,722 | Hersberger | June 12, 1951 |
| 2,568,144 | Cremer et al. | Sept. 18, 1951 |
| 2,568,384 | Cheronis | Sept. 18, 1951 |
| 2,579,984 | Trowbridge | Dec. 25, 1951 |

OTHER REFERENCES

Chemistry and Industry, Apr. 5, 1947, pp. 171–176; Silicones—Shailer L. Bass.

Industrial and Eng. Chemistry, vol. 39, No. 11, November 1947; Polymethylsiloxanes—Atkins et al., p. 1395 et seq.; Polyorganosiloxanes—Fox et al., p. 1401 et seq.